US005488804A

United States Patent [19]

Batscher

[11] Patent Number: 5,488,804

[45] Date of Patent: Feb. 6, 1996

[54] CONSTRUCTION DOOR SAVING DEVICE

[76] Inventor: Robert K. Batscher, 68 7th St., Bonita Springs, Fla. 33923

[21] Appl. No.: 410,499

[22] Filed: Mar. 24, 1995

[51] Int. Cl.[6] .................... B60J 5/04

[52] U.S. Cl. .................... 49/462; 52/717.05

[58] Field of Search .................... 49/462, 380, 460; 52/717.01, 717.05

[56] References Cited

U.S. PATENT DOCUMENTS

| | | | |
|---|---|---|---|
| 1,197,769 | 5/1916 | Shane . | |
| 1,523,285 | 1/1925 | Pritchett | 49/462 X |
| 2,226,615 | 12/1940 | Killen | 49/462 |
| 2,740,658 | 4/1956 | Kesich | 296/44 |
| 3,618,261 | 5/1970 | Torbett | 49/380 |
| 3,667,163 | 6/1972 | Bjorum et al. | 49/462 |
| 4,443,508 | 4/1984 | Mehl | 428/122 |
| 4,587,761 | 5/1986 | Adell | 49/462 |
| 5,096,241 | 3/1992 | Badger | 292/288 |
| 5,209,017 | 5/1993 | Ridge | 49/380 |
| 5,227,217 | 7/1993 | Roberts et al. | 49/462 X |
| 5,291,631 | 3/1994 | Schjoneman | 16/86 R |
| 5,365,697 | 11/1994 | Vanderpan | 49/380 |

*Primary Examiner*—Philip C. Kannan
*Attorney, Agent, or Firm*—Merrill N. Johnson

[57] ABSTRACT

A device for protecting a hung door and the adjacent trim and wallboard from damage during construction. The device has a channel having an closed end and a open end and a plurality of upstanding sidewalls therebetween. The open end and the closed end and the upstanding sidewalls form an engagement slot that releasably grips a vertical edge of the door. Each upstanding wall is fabricated from a resilient material that contacts an exterior surface of the door without damaging the door in releasable communication. A bumper is disposed on an outer surface of the channel for resiliently contacting the adjacent wallboard and trim and rebounding away after contact. Finally, a wedge is gluably adhered to an outer surface of the closed end of the channel and urges closed communication between the door and an upstanding jamb member adjacent the door.

21 Claims, 1 Drawing Sheet

CONSTRUCTION DOOR SAVING DEVICE

FIELD OF THE INVENTION

The present invention relates to a device to prevent damage to doors and, more particularly protecting and aligning doors hung during the construction phase.

BACKGROUND OF THE INVENTION

Throughout the United States steps are being taken to improve the protection of construction elements that must withstand constant use by tradesmen not associated with the construction element. For example, carpenters will frequently install interior passage doors in residential construction and these doors will be used for opening and closing by other tradesmen such as plumbers, painters, sheetrockers, electricians and the like. These other tradesmen have no responsibility whatsoever to protect the doors hung in place and accordingly, many doors are damaged prior to "trimming out" with locksets and latches. Further, the doors are swung violently by tradesmen, or the wind which causes damage to the adjacent baseboard and chair rail trim and even the wallboard.

When a building is under construction, the interior and exterior doors are hung, fit and painted or stained and finished. This work occurs weeks and sometimes even months prior to the door hardware being installed. This leaves the doors and the wallboard and the wooden trim adjacent to the doors vulnerable to damage that is caused by the construction traffic or even the wind blowing the doors open or shut.

The present invention achieves its intended purposes, objectives and advantages over the prior art devices through a new, useful and unobvious combination of component elements, which is simple to use, with the utilization of a minimum number of functioning parts, at a reasonable cost to manufacture, assemble, test and by employing only readily available material.

Therefore, it is an object of the present invention to provide a device that will protect a hung door from damage by other tradesmen. It is a further object of the present invention to provide a device that will prevent damage to the adjacent construction such as chair rails, baseboard trim, or wallboard from damage by the door swinging freely against the adjacent construction materials.

It is yet another object of the present invention to provide a device that will aid the carpenter in aligning the door within the door jamb to achieve a proper alignment within the door jamb.

It is still a further object of the present invention to provide a device that will keep the door in a closed status during the construction phase.

A final object of this invention is to provide a construction door saver in accordance with the preceding objects and which at the end of the construction phase can be removed from the hung door and be used again over and over to provide a device that is long lasting and trouble free in operation.

Therefore, it can be appreciated that there exists a continuing need for a new and improved construction door saver which can be used for protecting a door and the adjacent trim from damage during the construction phase. The present invention fulfills this need.

For a better understanding of the invention, its operating advantages and the specific objects attained by its use, reference should be had to the accompanying drawings and descriptive matter in which there is illustrated preferred embodiments of the invention.

SUMMARY OF THE INVENTION

The invention is defined by the appended claims with specific embodiments shown in the attached drawings. For the purpose of summarizing the invention, the invention provides a device for protecting a hung door and the adjacent trim and wallboard from damage during the construction phase. The device comprises a "U" shaped channel having an closed end and an open end and a plurality of upstanding sidewalls therebetween. The combination of the closed end and the open end and the upstanding sidewalls therebetween define an engagement slot that releasably grips a vertical edge of the door. The channel is fabricated from a resilient material that contacts an exterior surface on each side of the door in releasable communication without damaging the door. Further, a bumper is disposed on an outer surface of the channel fabricated from a resilient material for contacting the adjacent wallboard and trim and rebounding away from the adjacent wallboard and trim. Finally, a wedge is disposed on an outer surface of the closed end of the "U" shaped channel. The wedge is adapted for urging closed communication between the hung door and an upstanding jamb adjacent the door.

The device can also be used for alignment purposes by carpenters when the door is being hung. In this embodiment of the invention, the wedge has a leading edge and a trailing edge for urging releasable frictional communication with an upstanding member of the adjacent door jamb. If the wedge does not fully engage the upstanding member of the adjacent door jamb, it means that the door is not hung properly. Likewise, if the door is closed and the wedge fails to make contact with the adjacent upstanding member of the door jamb, this also means that the door is hung improperly.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the invention, reference should be had to the following detailed description taken in connection with the accompanying drawings in which:

FIG. 2 discloses the neoprene bumper for protecting the adjacent wallboard and trim and the wedge for precise alignment and holding of the door within the door jamb during the construction phase. FIG. 2 also discloses the outwardly projecting arcuate edge of each upstanding side wall;

DETAILED DESCRIPTION OF THE PREFERRED EMBODIMENT

Figure 1:
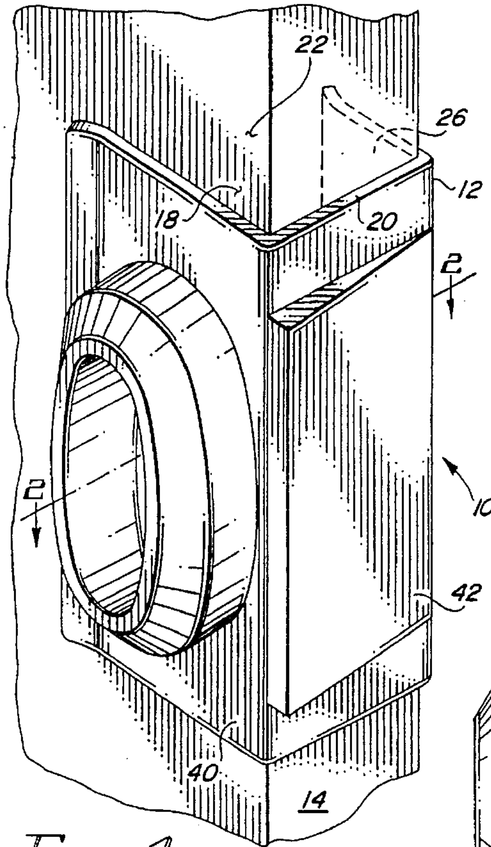
FIG. 1 is a perspective illustration of the invention in use and operation on a hung door.
Figure 2:
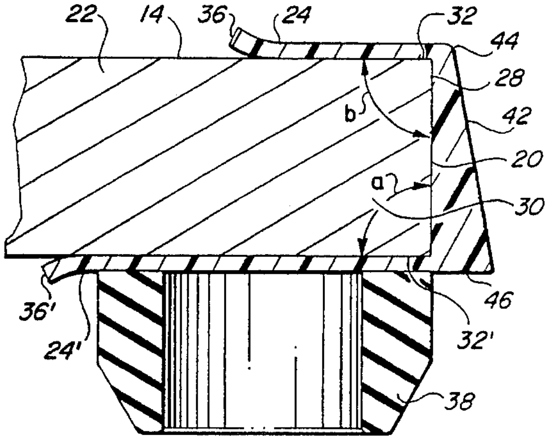
FIG. 2 is a top plan sectional view taken along viewing lines 2—2 in FIG. 1.
Figure 3:
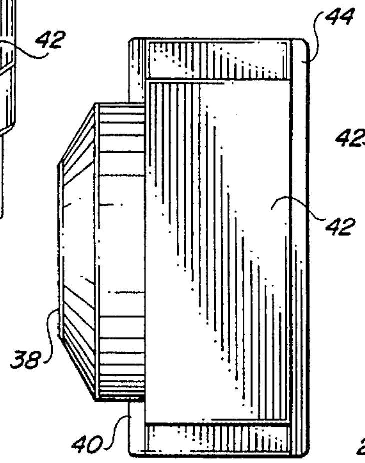
FIG. 3 is a front elevation view of the invention as disclosed in FIG. 1.
Figure 4:
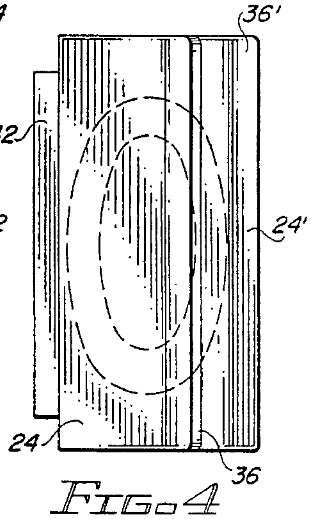
FIG. 4 is a right side elevation view of the invention as disclosed in FIG. 1.
Figure 5:
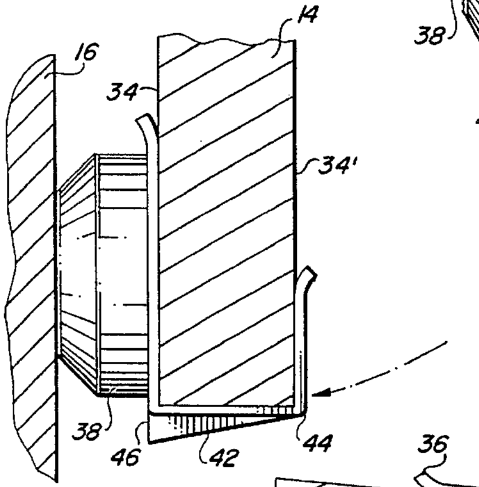
FIG. 5 is a top plan view of the invention disclosing the neoprene bumper in resilient contact with the adjacent wallboard.

The instant invention will protect a finished door and the adjacent sidewalls and trim from damage due to the hung door swinging open for whatever reason. The device is installed when the door is hung and delays the installation of expensive door hardware until the house is ready for "trimming out". It is well known that door hardware disappears from the door when the hardware is installed early in the construction cycle. The device protects the door and the adjacent trim during the entire construction phase. Also, it postpones installation of the door lockset and latches until the house is ready for "trimming out".

Referring generally to FIG. 1 through FIG. 7, the invention 10 comprises a device 12 for protecting a hung swinging door 14 and the adjacent trim and wallboard 16 from damage during construction. The device 12 is a "U" shaped channel 18 having an closed end 20 and an open end 22 and a plurality of upstanding sidewalls 24,24' therebetween that define an engagement slot 26. The engagement slot 26 releasably grips a vertical edge of the door 14. The device 12 is installed on a vertical door edge 28 that eventually houses a latch and lockset. In the preferred embodiment of the invention, the width of the open end 22 is greater than the width of the closed end 20. This difference in width forms a trapezoidal engagement slot 30. The trapezoidal slot 30 allows gradual frictional contact between the channel 18 and both surfaces 32,32' of the door 14. Further, the width of the closed end 20 is greater than the width of the vertical edge 28 of the door 14 to allow the channel 18 to fully contact the vertical edge 28 of the door 14. The thickness of the closed end 20 is critical to insure that the door 14 closes with the device 12 installed on the vertical edge 28. Industry standards for clearance between doors and door jambs are about between 1/16" to 1/4". Accordingly, the thickness of the closed end 20 is about between 1/32" to 1/8". The channel 18 can be fabricated from any resilient thermosetting resin, preferably plastic.

Each upstanding sidewall 24,24' is adapted for contacting an exterior surface 34,34' of the door 14 in releasable communication. Each upstanding sidewall 24,24' further includes an outwardly arcuate edge 36,36' adjacent the open end 22 that guides the device 12 for precise alignment and installation of the channel 18 on the vertical edge 28 of the door 14 without damage to the exterior surfaces 34,34' of the door 14. The upstanding sidewalls 24,24' have unequal lengths for easy and quick installation on the door 14. The closed end 20 and the two upstanding sidewalls 24,24' do not form perfect 90 degree angles at their respective intersections. The vertical edge 28 is beveled approximately 1/32 of an inch to allow the door to enter the area adjacent the door jamb gradually. Accordingly, the longer sidewall 24' forms an angle "a" with the closed end 20 less than 90 degrees to conform to the bevel of the vertical edge 28. Contrariwise, the shorter sidewall 24 forms an angle "b" with the closed end 20 greater than 90 degrees to conform to the bevel of the vertical edge 28.

A bumper 38 is disposed on an outer surface 40 of the channel 18 and is adapted for resiliently contacting the adjacent wallboard and trim 16 and rebounding away from the adjacent wallboard and trim 16 without damage to the door 14 or the adjacent wallboard and trim 16. The bumper 38 is gluably adhered to the outer surface 40 of one of the upstanding sidewalls 24,24'. The bumper 38 can be fabricated from any resilient material, preferably neoprene. A wedge 42 has a leading edge 44 and a trailing edge 46 and is disposed on an outer surface 48 of the closed end 20 of the channel 18. In the preferred embodiment of the invention, the channel and the wedge are integrally formed in one operation from any resilient polymer, preferably a thermosetting plastic. In a less preferred embodiment of the invention, the wedge is gluably adhered to the outer surface 48. Further, the wedge 42 is adapted to maintain closed communication between the door 14 and an upstanding jamb member 50 adjacent the door 14. The wedge 42 can be fabricated from wood or any resilient thermosetting resin, preferably plastic.

Figure 6:
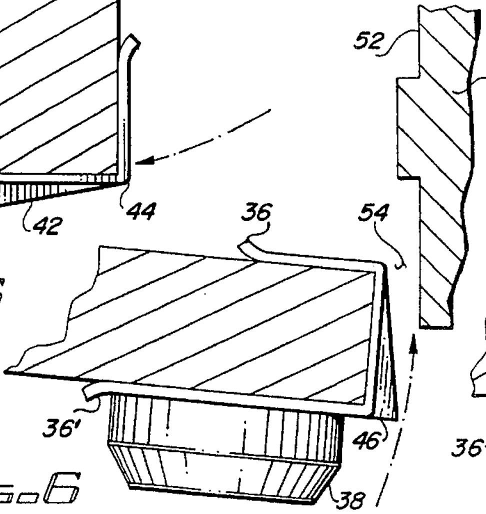
FIG. 6 is a top plan view of the invention being used for precise alignment showing the leading edge of the wedge being in proximity to the adjacent door jamb.
Figure 7:
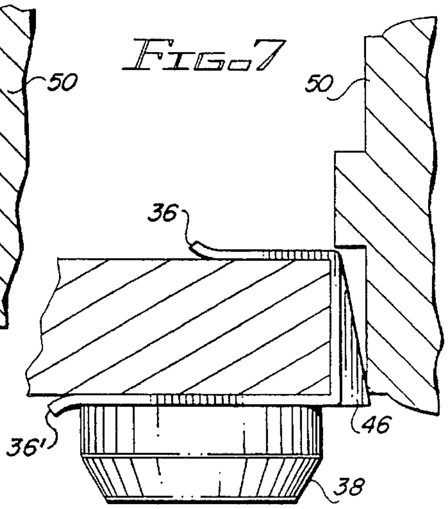
FIG. 7 is a top plan view of the invention after the alignment showing the trailing edge of the wedge in frictional holding contact with the adjacent door jamb.

Both embodiments of the invention can be utilized for another purpose. The device 12 can be used by the carpenter for aligning a hung door 14 within an adjacent door jamb 52 during construction, as best seen in FIGS. 6 and 7. The device 12 can also be used by quality control and inspection personnel to gauge the hung door 14 for acceptability after the construction phase but before acceptance of the work by the owner. The "U" shaped channel has the same closed end and the same open end and the same plurality of upstanding sidewalls therebetween that define the trapezoidal engagement slot 30. Likewise, the engagement slot 30 releasably grips the vertical edge of the door 14. Each upstanding wall is adapted to contact the exterior surface 34,34' of the door 14 in releasable communication. The upstanding sidewalls have unequal lengths as in the preferred embodiment of the invention. The bumper 38 is disposed on the outer surface 40 of the channel 18.

The wedge 42 has a leading edge 44 and a trailing edge 46 and is disposed on the outer surface 40 of the closed end 20 of the channel 18. The thickness of the leading edge 44 is about between 1/32" to 1/8". The thickness of the trailing edge 46 is greater than the thickness of the leading edge 44. This allows the wedge 42 to gradually enter a clearance zone 54 between the door 14 and the adjacent door jamb 52. The thickness of the trailing edge 46 is about between 1/8" to 3/8". The wedge 42 is adapted for making releasable frictional contact with the upstanding member 50 of the adjacent door jamb 52.

The present disclosure includes that contained in the appended claims, as well as that of the foregoing description. Although this invention has been described in its preferred forms with a certain degree of particularity, it is understood that the present disclosure of the preferred form has been made only by way of example and that numerous changes in the details of structures and the combination and arrangement of parts may be resorted to without departing from the spirit and scope of the invention as claimed.

What is claimed is:

1. A device for protecting a hung door and the adjacent trim and wallboard from damage during construction comprising in combination:

a "U" shaped channel having an open end and a closed end and a plurality of upstanding sidewalls therebetween defining an engagement slot, the engagement slot for releasably gripping a vertical edge of the door, each upstanding sidewall being adapted for contacting an exterior surface of the door in releasable communication;

a bumper disposed on an outer surface of the channel and adapted for resiliently contacting the adjacent wallboard and trim and rebounding away from the adjacent wallboard and trim; and a wedge having a leading edge and a trailing edge and disposed on an outer surface of the closed end of the channel, the wedge being adapted for urging closed communication between the door and an upstanding jamb member adjacent the door.

2. A device for protecting a hung door and the adjacent trim and wallboard as recited in claim 1 wherein the wedge is gluably adhered to the outer surface of the closed end of the channel.

3. A device for protecting a hung door and the adjacent trim and wallboard as recited in claim 1 wherein the wedge is fabricated from any resilient thermosetting resin, preferably plastic.

4. A device for protecting a hung door and the adjacent trim and wallboard as recited in claim 1 wherein the channel is fabricated from any resilient thermosetting resin, preferably plastic.

5. A device for protecting a hung door and the adjacent trim and wallboard as recited in claim 1 wherein the bumper is fabricated from any resilient material, preferably neoprene.

6. A device for protecting a hung door and the adjacent trim and wallboard as recited in claim 1 wherein the bumper is gluably adhered to an outer surface of one of the upstanding sidewalls.

7. A device for protecting a hung door and the adjacent trim and wallboard as recited in claim 1 wherein a width of the open end is greater than a width of the closed end for forming a trapezoidal engagement slot for urging gradual frictional contact between the channel and both surfaces of the door.

8. A device for protecting a hung door and the adjacent trim and wallboard as recited in claim 1 wherein each upstanding sidewall further includes an outwardly arcuate edge adjacent the open end for urging precise alignment and installation of the channel on the vertical edge of the door.

9. A device for protecting a hung door and the adjacent trim and wallboard as recited in claim 1 wherein the upstanding sidewalls have unequal lengths.

10. A device for protecting a hung door and the adjacent trim and wallboard as recited in claim 1 wherein a width of the closed end is greater than the width of the edge of the door.

11. A device for protecting a hung door and the adjacent trim and wallboard as recited in claim 1 wherein the thickness of the closed end is about between 1/32 inch to 1/8 inch.

12. A device for protecting a hung door and the adjacent trim and wallboard as recited in claim 1 wherein the channel and the wedge are integrally fabricated from any resilient thermosetting resin, preferably plastic.

13. A device for aligning a hung door within an adjacent door jamb during construction and gauging the fit of the door in the adjacent door jamb after construction comprising in combination:

a "U" shaped channel having an closed end and an open end and an plurality of upstanding sidewalls therebetween defining an engagement slot, the engagement slot for releasably gripping a vertical edge of the door, each upstanding wall being adapted for contacting a surface of the door in releasable communication;

a bumper disposed on an outer surface of the channel and adapted for resiliently contacting the adjacent wallboard and trim and rebounding away from the adjacent wallboard and trim; and a wedge having a leading edge and a trailing edge and disposed on an outer surface of the closed end of the channel, the wedge being adapted for urging releasable frictional communication with an upstanding member of the adjacent door jamb.

14. A device for aligning a hung door within a door jamb during construction as recited in claim 13 wherein the trailing edge has a thickness greater than a thickness of the leading edge.

15. A device for aligning a hung door within a door jamb during construction as recited in claim 14 wherein the thickness of the trailing edge is about between 1/8 inch to 1/2 inch.

16. A device for aligning a hung door within a door jamb during construction as recited in claim 14 wherein the thickness of the leading edge is about between 1/32 inch to 1/8 inch.

17. A device for aligning a hung door within a door jamb during construction as recited in claim 14 wherein the upstanding sidewalls have unequal lengths.

18. A device for aligning a door hung within a door jamb during construction as recited in claim 13 and further including an angle between one of the upstanding sidewalls and the closed end of the channel that is less than 90 degrees.

19. A device for aligning a hung door within a door jamb during construction as recited in claim 18 wherein the sidewall is the longer sidewall.

20. A device for aligning a hung door within a door jamb during construction as recited in claim 13 and further including an angle between one of the upstanding sidewalls and the closed end of the channel that is greater than 90 degrees.

21. A device for aligning a hung door within a door jamb during construction as recited in claim 20 wherein the sidewall is the shorter sidewall.

* * * * *